Patented Jan. 28, 1941

2,230,005

UNITED STATES PATENT OFFICE 2,230,005

PROCESS FOR THE PRODUCTION OF VALUABLE PRODUCTS FROM CRACKED PETROLEUM DISTILLATES

Franz Rudolf Moser, Amsterdam, Netherlands, assignor to Shell Development Company, San Francisco, Calif., a corporation of Delaware No Drawing. Application December 27, 1938, Serial No. 248,022. In the Netherlands January 4, 1938

10 Claims. (Cl. 260—537)

The present invention relates to an improved process for the production of valuable polymerization and polymerization-condensation products by reacting cracked petroleum distillates with unsaturated compounds containing a conjugated carbonyl group.

Unsaturated compounds containing a conjugated carbonyl group undergo certain characteristic reactions and comprise a distinct class of compounds. One of the most characteristic reactions of compounds of this class is the Diels-Alder reaction. In this characteristic reaction the unsaturated compound containing a conjugated carbonyl group is added to a conjugated diolefine by so-called 1,4 addition to form cyclic polymerization products—

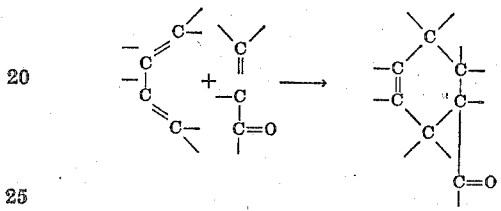

It has also been found that under certain conditions compounds of this class also react with compounds containing an isolated ethylene linkage. By an isolated ethylene linkage is meant a single ethylene linkage or an ethylene linkage too far removed from any unsaturated bond to be affected by conjugation. This reaction is entirely unlike the former and apparently proceeds by so-called 1,2 addition according to the scheme—

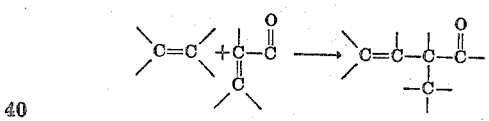

Reactions of this latter type have been found to be very useful for the production of valuable polymerization products from inexpensive and available cracked petroleum distillates. See, for example, U. S. Patent 2,055,456.

An object of the present invention is to provide a method for the production of valuable products from the olefines in cracked petroleum distillates by interpolymerization with unsaturated compounds containing a conjugated carbonyl group, which affords better yields of products, requires less expensive apparatus, and allows a more simple and economical execution.

I have found that cracked petroleum distillates in general contain small amounts of one or more constituents which in the presence of the unsaturated carbonylic compounds and under the conditions necessary to produce the desired reaction with the olefines, induce or initiate certain undesirable side reactions which generate considerable pressure and prevent the attainment of the maximum yields of desirable products. I have furthermore found that if these disturbing compounds are first destroyed and/or removed from the cracked petroleum distillate by a suitable treatment, the desired reaction takes place much smoother, at much lower pressure and gives much better yields of the desired products.

In the present specification and claims the term "cracked petroleum distillate" is used to designate a normally liquid product containing a substantial proportion of aliphatic olefine hydrocarbons obtained during cracking of petroleum hydrocarbons. Suitable cracked petroleum distillates are, for example, the distillates obtained upon cracking kerosene distillates, stove oil distillates, paraffin waxes and the like. These cracked petroleum distillates may contain from about 15% to over 50% of olefinic hydrocarbons depending upon the method and conditions used in the cracking process.

The cracked petroleum distillate, according to the process of the present invention, before being reacted with the carbonylic compound is first treated to remove or destroy the compounds which initiate and/or promote the objectionable side reactions. I have found that these objectionable compounds, found in general in cracked petroleum distillates, may be removed by subjecting the distillate to a refining treatment. In general, the chemical, physical and physical-chemical liquid and vapor phase refining treatments which are suitable for the refining of motor fuels are effective and may be used. Of the available refining agents I have found the mineral acids such as $H_2SO_4$, $H_3PO_4$, sulfonic acids, etc., and the salts which catalyze the Friedel-Crafts condensation such as $AlCl_3$, $FeCl_3$, $ZnCl_2$, etc., as also selective solvents such as liquid sulfur dioxide, furfural and the like, to be very effective and most advantageously used.

Although I subject the cracked petroleum distillate to a refining treatment similar to that customarily given to motor fuels it is unnecessary, and in fact less desirable, to refine the cracked petroleum distillate to meet motor fuel specifications since in such refining processes a substantial proportion of the most reactive olefines are polymerized or condensed causing a substantial decrease in the olefine content of the cracked petroleum distillate. In general, I have found relatively mild refining treatments to be sufficient and preferable since they leave the olefine content of the cracked petroleum distillate substantially unchanged. For example, a treatment with a fairly dilute acid solution is usually sufficient to produce the desired results and does not affect the olefine content of the distillate to any appreciable extent. A small decrease in the bromine number (a measure of the extent of unsaturation) of the cracked petroleum distillate may sometimes be noticed even when the refining treatment is very mild. This appears to be due to the removal of small amounts of conjugated diolefines which are sometimes found in the cracked distillates in small quantities and does not represent a loss of the desired olefines.

The cracked petroleum distillate, after being subjected to the refining treatment as above described, and, if desired, washed, and/or dried, is reacted with a compound containing an ethylenic linkage and a carbonyl group in conjugated relation, i. e., containing the structural grouping—

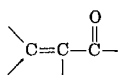

Examples of suitable classes of compounds containing this structural grouping are the α β unsaturated acids, acid anhydrides, esters, aldehydes, ketones, amides, etc.

While all compounds containing this structural grouping react in general with the olefines in cracked petroleum distillates to form polymerization products by 1,2 addition, those compounds in which the conjugated carbonyl group is part of a carboxyl group are especially suitable for the present process. The products obtained from cracked petroleum distillates using these carboxylic compounds are especially valuable since they contain carboxyl groups which may be converted into the acids, alkali and amine salts, esters, amides, amidols, etc. In the form of the free acids many of the products are valuable anti-corrosion agents. The alkali salts of many of the products are valuable water-soluble resin-like bodies. These carboxyl-containing products can, moreover, be reacted with polyhydric alcohols to form a whole series of inexpensive resins having characteristic properties. By reacting glycerol, for example, with a product containing two free carboxyl groups valuable resins of the alkyd type are obtained. The present process is especially advantageous for the production of these resins since when utilizing a cracked petroleum distillate previously treated as above described the resins may in many cases be prepared from the cracked petroleum distillate in one operation. For example, the cracked petroleum distillate, a suitable dibasic acid, such as maleic acid anhydride, and a polyhydric alcohol, such as glycerol, may be mixed in the desired proportions and the whole reacted until the desired average molecular weight of the product is obtained. The reaction may be carried out in the presence of various solvents, dyestuffs, plasticizing agents, fillers, other resinous bodies, catalysts, etc., if desired.

The interpolymerization of the olefines in the cracked petroleum distillate and the unsaturated compound containing a conjugated carbonyl group is in general effected at a temperature of at least 160° C. When the reaction is carried out using untreated cracked petroleum distillate high pressure equipment must be employed since a considerable pressure is developed. When using cracked petroleum distillate which has been previously treated as above described, on the other hand, the reaction takes place smoothly at much lower pressures.

*Example I*

A cracked petroleum distillate boiling between 280°–320° C., and having a bromine number of 43 (obtained by cracking of crude paraffin cakes obtained by dewaxing a furfural raffinate of a Venezuelan lubricating oil distillate) was treated with 5% of an 80% solution of sulfuric acid, washed with caustic solution and washed with water. After this treatment the bromine number of the cracked petroleum distillate was 40. This treated distillate was reacted with the calculated quantity of maleic acid anhydride in an autoclave at a temperature of about 210° C. The reaction proceeded smoothly, and developed only two atmospheres pressure.

When carrying out the reaction at the same temperature using the untreated cracked petroleum distillate a pressure of 15 atmospheres was developed.

The yield of useful products when utilizing the treated cracked petroleum distillate was, moreover, about 30% higher than when using the untreated distillate.

*Example II*

A cracked petroleum distillate boiling between 280 and 320° C. and having a bromine number of 39.1 (obtained by vapour phase cracking of crude paraffin cakes) was extracted twice with an equal quantity of furfural (calculated on the distillate) at a temperature of 0° C. From the resulting raffinate (which was found to have a bromine value of 44.2) 180 parts by weight were heated with 112 parts by weight of maleic acid anhydride first during 2 hours at 195° C. while refluxing and then—whilst constantly stirring—during 8 hours at 220° C. The yield of useful condensation product obtained was approximately 10% higher than when using the untreated distillate.

If the cracked petroleum distillate is reacted with the anhydride of an acid such as maleic acid anhydride, the product retains the acid anhydride structure. After removing the unreacted cracked petroleum distillate and maleic acid anhydride, for instance by vacuum distillation, the product may still contain small quantities of maleic acid anhydride and other impurities. I have found that the impurities may be substantially removed from the product without hydrating the acid anhydride to any appreciable extent by washing with hot water. For example, if the product is stirred with an equal volume of water at a temperature of from about 80–100° C., and then allowed to stand, the dicarboxylic acid anhydride (product) settles out as a lower phase without being hydrated to an appreciable extent while the impurities remain dissolved in the upper aqueous phase.

The dicarboxylic acid anhydride products freed from water-soluble impurities as above described, are well suited for the production of alkyd type resins by reaction with a polyhydric alcohol and give lighter colored products than those produced in one operation.

In some cases it is desired to recover the dicarboxylic acid anhydride product in the hydrated form. This has hitherto been accomplished by dissolving the product in an aqueous alkali solution and then converting the salts of the dicarboxylic acids to the free acids by means of a mineral acid. I have found that the dicarboxylic acid anhydrides may be hydrated to the free dicarboxylic acids in a simpler and more economical manner by treating the dicarboxylic acid anhydride with steam preferably above 100° C., for example 150-160° C. The hydration according to this method usually requires from one to about five hours, depending upon the dicarboxylic acid anhydride in question, the amount and temperature of the steam, etc.

The dicarboxylic acids produced from cracked petroleum distillates, purified and recovered according to the method of the present invention, are obtained in much better yields, in better purity, and in a more economical manner than has hitherto been realized.

I claim as my invention:

1. Process for the production of valuable products from cracked petroleum distillates which comprises subjecting a cracked petroleum distillate to a refining treatment which is insufficient to cause the distillate to satisfy motor fuel specifications and too mild to lower the bromine number of the distillate but sufficient to remove therefrom those components which generate high pressures when employed in the subsequent step, reacting the treated cracked petroleum distillate with maleic acid anhydride, removing the unreacted cracked petroleum distillate and maleic acid anhydride, and washing the polymerization product with hot water.

2. Process for the production of valuable products from cracked petroleum distillates which comprises subjecting a cracked petroleum distillate to a refining treatment which is insufficent to cause the distillate to satisfy motor fuel specifications and too mild to lower the bromine number of the distillate but sufficient to remove therefrom those components which generate high pressures when employed in the subsequent step, reacting the treated cracked petroleum distillate with maleic acid anhydride, separating the dicarboxylic acid anhydride reaction products and subjecting the same to the action of dry steam, whereby the dicarboxylic acid anhydrides are hydrated to the corresponding dicarboxylic acids.

3. Process for the production of valuable products from cracked petroleum distillates which comprises subjecting a cracked petroleum distillate to a refining treatment which is insufficient to cause the distillate to satisfy motor fuel specifications and too mild to lower the bromine number of the distillate but sufficient to remove therefrom those components which generate high pressures when employed in the subsequent step and reacting the treated cracked petroleum distillate with maleic acid anhydride.

4. Process for the production of valuable products from cracked petroleum distillates which comprises subjecting a cracked petroleum distillate to a refining treatment which is insufficient to cause the distillate to satisfy motor fuel specifications and too mild to lower the bromine number of the distillate but sufficient to remove therefrom those components which generate high pressures when employed in the subsequent step and reacting the treated cracked petroleum distillate with a compound containing two carbonyl groups conjugated with respect to an ethylenic linkage.

5. Process for the production of valuable products from cracked petroleum distillates which comprises subjecting a cracked petroleum distillate to a refining treatment which is insufficient to cause the distillate to satisfy motor fuel specifications and too mild to lower the bromine number of the distillate but sufficient to remove therefrom those components which generate high pressures when employed in the subsequent step and reacting the treated cracked petroleum distillate with a compound containing an ethylenic linkage and a carboxyl group in conjugated relation.

6. Process for the production of valuable products from cracked petroleum distillates which comprises subjecting a cracked petroleum distillate to a refining treatment with an aqueous solution of sulfuric acid having a concentration of about 80% $H_2SO_4$ under such conditions that there is no substantial decrease in the bromine number of the treated distillate, and reacting the treated cracked petroleum distillate with a compound containing an ethylenic linkage and a carbonyl group in conjugated relation.

7. Process for the production of valuable products from cracked petroleum distillates which comprises subjecting a cracked petroleum distillate to a refining treatment which is insufficient to cause the distillate to satisfy motor fuel specifications and too mild to lower the bromine number of the distillate but sufficient to remove therefrom those components which generate high pressures when employed in the subsequent step and reacting the treated cracked petroleum distillate with a polyhydric alcohol and a compound containing two carboxylic acid groups conjugated with respect to an ethylenic linkage.

8. Process for the production of valuable products from cracked petroleum distillates which comprises subjecting a cracked petroleum distillate to a refining treatment which is insufficient to cause the distillate to satisfy motor fuel specifications and too mild to lower the bromine number of the distillate but sufficient to remove therefrom those components which generate high pressures when employed in the subsequent step and reacting the treated cracked petroleum distillate with a compound containing an ethylenic linkage and a carbonyl group in conjugated relation.

9. A process for the production of valuable products from cracked petroleum distillates which comprises subjecting a cracked petroleum distillate to a refining treatment with about 5% of its weight of an aqueous sulfuric acid solution having a concentration of about 80% $H_2SO_4$ under such conditions that there is no substantial decrease in the bromine number of the treated distillate, and reacting the thus treated cracked petroleum distillate with a compound containing an ethylenic linkage and a carbonyl group in conjugated relation.

10. A process for the production of valuable products from cracked petroleum distillates which comprises subjecting a cracked petroleum distillate to a refining treatment with about 5% of its weight of an aqueous sulfuric acid solution having a concentration of about 80% $H_2SO_4$ under such conditions that there is no substantial decrease in the bromine number of the treated distillate, and reacting the thus treated petroleum distillate with maleic acid anhydride.

FRANZ RUDOLF MOSER.